May 31, 1932.  H. E. KAPLAN ET AL  1,860,463
AUTOMOBILE TOP
Filed May 24, 1929   2 Sheets-Sheet 2
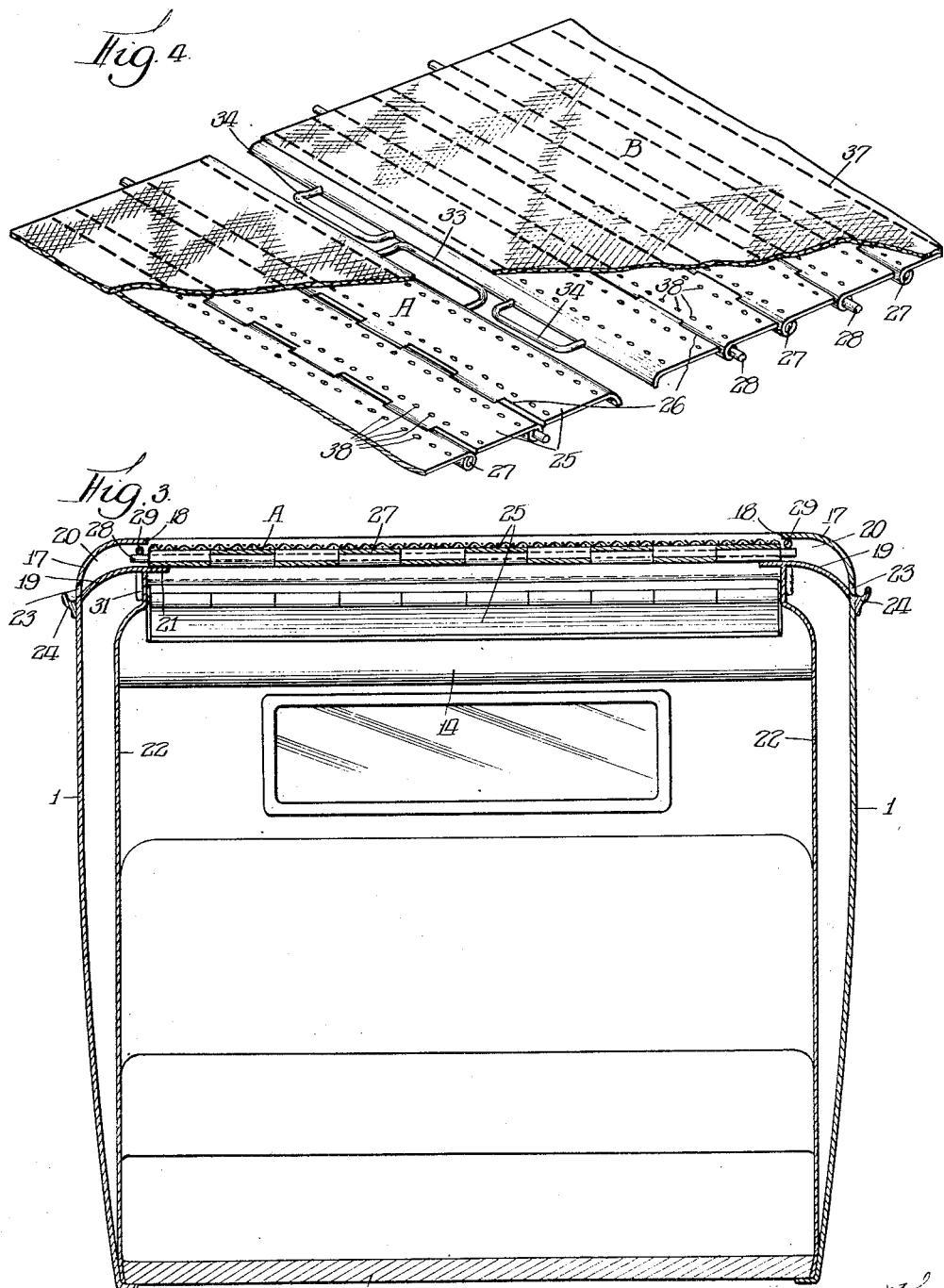

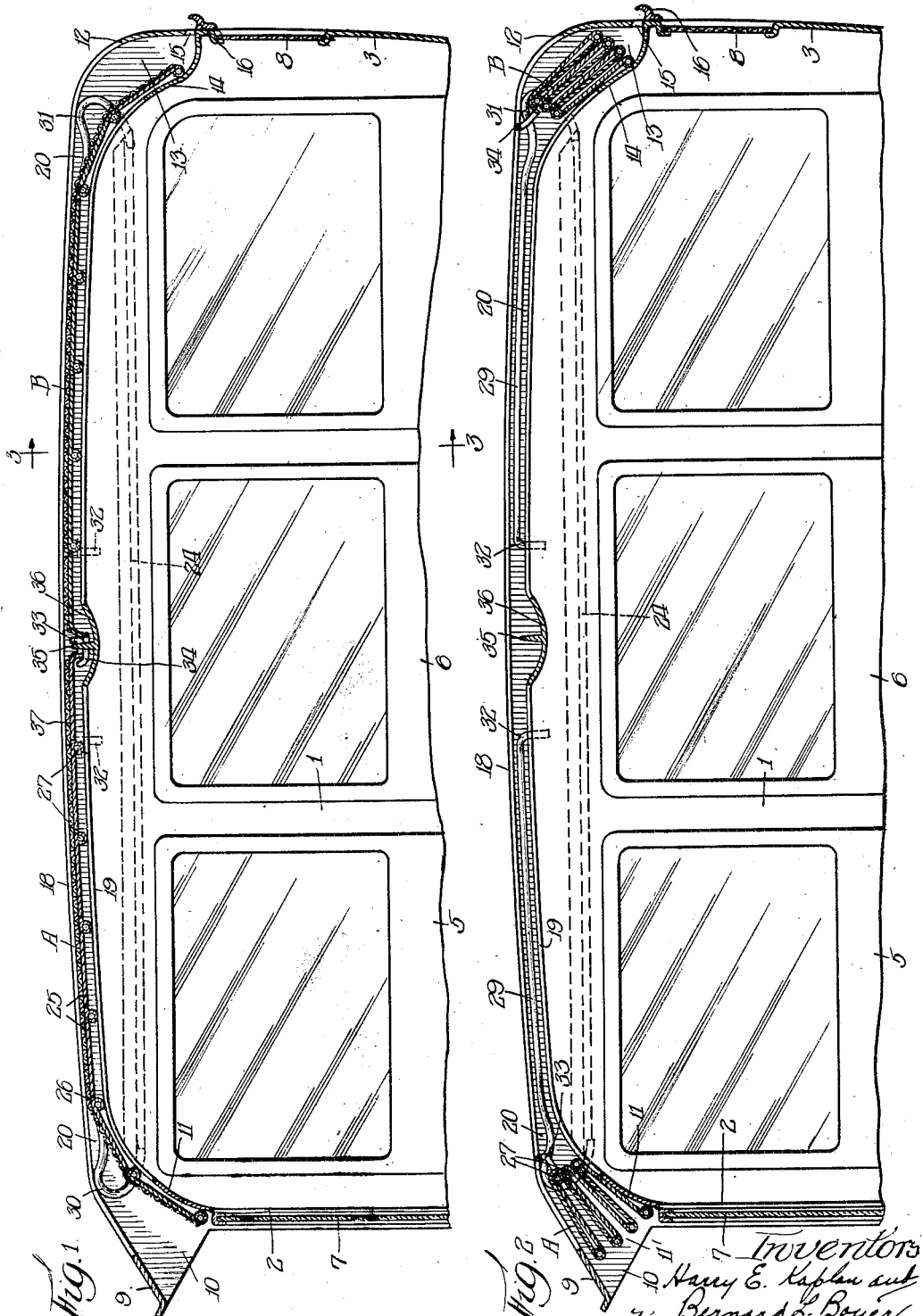

Patented May 31, 1932

1,860,463

UNITED STATES PATENT OFFICE

HARRY E. KAPLAN AND BERNARD L. BOUER, OF CHICAGO, ILLINOIS

AUTOMOBILE TOP

Application filed May 24, 1929. Serial No. 365,756.

Our invention relates to improvements in automobile bodies and the principal object of our invention is to provide an automobile body with a movable roof or top of which can be opened or closed at will to convert the body into a closed or open type of body with all of the advantages of both types.

A further object is to provide an automobile body of the closed type with a flexible roof or top member which can be folded compactly into a compartment in the body to uncover the top and convert the body into one of the open type.

A further object is to provide a novel roof to the top structure for closed automobile bodies which is adapted to be folded into the body when the top is to be opened, and unfolded and extended over the top to close said top.

Other objects of our invention appear hereinafter.

Referring to the drawings

Fig. 1 is a vertical longitudinal section of the upper portion of an automobile body embodying our invention, showing the roof members in closed position;

Fig. 2 is a similar view showing the roof members in open position;

Fig. 3 is a transverse vertical section substantially on the line 3—3 of Fig. 1; and Fig. 4 is a perspective view of one of the folding roof sections.

In the drawings we have illustrated our invention as embodied in an automobile body of the closed type. Bodies of this type have side walls 1, a front wall 2, a rear wall 3 and floor 4. The side walls have front and rear door members 5 and 6 and the front wall has a usual wind shield 7. The rear wall usually has a rear window 8 located above the cushions of the rear seat. The front end of the body is equipped with a visor 9 extending over the wind shield and the ends 10 of this visor are connected to and form continuations of the upper corners of the side walls. We utilize the space within the visor to form a compartment for receiving the forward section of the roof member when it is folded as hereinafter described.

In the present structure the top is open and this opening extends over practically the entire area of the top of the body. The front wall Figs. 1 and 2, terminates at 11 to form the inner wall of the compartment 11' within the visor for the folded forward roof members. In like manner the rear wall 3 terminates at 12 to form the outer wall of the compartment 13 for receiving the folded rear roof member. The inner wall of the compartment 13 is formed by the transverse wall member 14 which joins the rear wall 3 and closes lower end of the compartment 13. Holes 15 are provided in the rear wall 3 communicating with the gutter 16 across the rear end of the body so as to drain water from the compartment 13 and prevent it from entering the interior of the body.

In the present structure upper edge portions 17 are turned horizontally and terminate at 18 to form the side edges of the top opening. Guiding and supporting members 19 extend along the upper edges of the side walls beneath the edge portions 17. They are spaced from said edge portions to provide guide channels 20 for the edges of the roof members. The inner longitudinal edges 21 of these guide members extend inwardly beyond the edges 18 of the guide channels to overlap the edges of the roof members and prevent water from entering the body. The inner edges of the members 19 are connected to the upper edges of the inner side walls 22 Fig. 3 of the body. The inner side walls of the body are spaced from the outer side walls, and in these spaces the frame work of the body is contained but not shown since it constitutes no part of our present invention. These longitudinal guide members 19 are curved downwardly and join the outer side walls to close the lower portions of the guide channels and prevent water entering the body. The guide channels have openings 23 in the outer side walls which communicate with the usual gutters 24 to drain the water from the channels. At their front ends the guide members 19 merge with the front wall 11 and at their rear ends they merge with the rear wall 14 of the rear compartment 13 so as to guide the roof members into the front and rear compartments 11' and 13 previously described.

The movable roof is preferably made in two parts A and B so that if desired a part only of the top opening may be uncovered, although when both roof members are folded into their compartments the entire top opening will be uncovered. The detail construction of the roof members A and B is shown more particularly in Fig. 4. Each member is made in sections formed by a plurality of flat transversely disposed strips or plates 25 arranged in parallel relation and joined along their adjacent edges 26 by any suitable hinge construction which permits the strips to be folded one upon the other as shown in Fig. 2. The hinge construction illustrated is of the piano hinge type having the hinge rods 27 extending the entire length of the hinge joints.

The roof members are preferably covered with a suitable flexible water proof fabric 37. In the present construction we fasten the fabric covering to the hinged strips or sections 25 by providing these strips with rows of holes 38 and by stitching the fabric through these holes. This construction forms a very substantial rigid roof for the body. At the same time it is a very flexible structure and therefore readily adaptable to being folded and unfolded repeatedly without damage thereto.

Every other one of these hinge rods extend beyond the edges of the roof members to form lugs 28 which co-operate with the channel guides 19 to support the roof members in position and at the same time permit said members to slide along the guide channels in the process of folding the roof members. We also provide spring guide members 29 in the guide channels. These are disposed above the lugs 28 but are intended to yieldingly engage the lugs 28 to guide said lugs and at the same time prevent rattles by taking up in play. The front and rear ends of these spring guide members are turned to form loops 30 and 31 so that spaces will be provided to accommodate the group of lugs 28 when the roof members are folded into the compartments at the front and rear ends of the body as shown in Fig. 2. The inner ends 32 are turned downwardly to form stops for the end most lugs 28 of the roof members to prevent the members from being pulled beyond their allotted positions. The ends of the roof members have handles 33 and 34 in the form of loops Fig. 4 by which the roof members may be conveniently handled to fold or unfold them. These handles are also intended to serve as convenient means for locking the roof sections in closed position by arranging them to engage with transverse lugs 35 disposed at the point where the two roof members meet Figs. 1 and 2. The lugs 35 are carried by a transverse bar 36 which extends across the top opening from one side to the other and is suitably connected with the guide members 19.

We are aware that changes, modification and arrangement of parts can be made without departing from the scope and spirit of the invention and we reserve the right to make such changes as fairly fall within the scope of the following claim.

We claim:

The combination of an automobile top having side and end walls and an opening in its top, guiding means disposed along the edges of said opening, means forming compartments at each of the ends of said opening, a roof member comprising two units formed of a plurality of hinged sections foldable upon each other for storage in said compartments, handles at adjacent ends of said units, transverse lugs substantially midway between the ends of said opening, said handles being secured to said lugs to retain said units in closing position over said opening when extended from said compartments.

HARRY E. KAPLAN.
BERNARD L. BOUER.